United States Patent
Bourke

[11] Patent Number: 5,566,768
[45] Date of Patent: Oct. 22, 1996

[54] DRILL ATTACHMENT

[76] Inventor: George C. Bourke, 8176 Spanker Ridge Dr., Bentonville, Ark. 72712

[21] Appl. No.: 414,029
[22] Filed: Mar. 31, 1995
[51] Int. Cl.⁶ .................................................. B23D 51/10
[52] U.S. Cl. ........................... 173/29; 30/392; 30/500; 144/48.6; 408/20
[58] Field of Search ..................... 173/29; 30/392, 30/500; 144/1 F; 408/20, 21

[56] References Cited

U.S. PATENT DOCUMENTS

| | | | |
|---|---|---|---|
| 2,631,619 | 3/1953 | Folli | 30/500 |
| 2,713,271 | 7/1955 | Dodegge | 30/392 |
| 2,764,188 | 9/1956 | Hoffman | 30/392 |
| 2,822,005 | 2/1958 | Lee et al. | 30/500 |
| 3,398,588 | 8/1968 | Mejia | 30/392 |
| 3,528,463 | 9/1970 | Mejia | 30/392 |
| 3,876,015 | 4/1975 | Kivela | 30/500 |
| 4,841,643 | 6/1989 | Colella | 30/500 |
| 4,949,463 | 8/1990 | Chen | 30/500 |
| 4,972,589 | 11/1990 | Povleski | 30/500 |
| 5,025,562 | 6/1991 | Palm | 30/392 |
| 5,083,376 | 1/1992 | Lentino | 30/392 |

FOREIGN PATENT DOCUMENTS 1384903  2/1975  United Kingdom ..................... 30/500

*Primary Examiner*—Scott A. Smith
*Attorney, Agent, or Firm*—Daniel R. Alexander; Head, Johnson & Kachigian

[57] ABSTRACT

A cordless, electric or pneumatic drill device which enables user to saw in a reciprocating action. A compact metal enclosure having steel helical and worm gears together with eccentric peg to drive arm to blade, the rotation of the drill enters the tool by the removable hexagonal shaft which can be inserted into the tool at three (3) different angles depending on the task. The worm gear meshes with a helical gear having an eccentric peg that is inside an elongated slot of the blade drive armature. As the worm gear rotates its speed is exchanged for torque in the helical gear the rotation of the helical gear is converted to a linear reciprocating motion which drives the blade.

2 Claims, 6 Drawing Sheets

DRILL ATTACHMENT

This invention relates to hand power tools specifically used for sawing materials in those awkward and/or remote places.

BACKGROUND DISCUSSION OF PRIOR ART

1. Sawing device attachable to regular electric drill: U.S. Pat. No. 4,949,463 This tool attachment mounts to the drill just one (1) way. The advantage my "Drill Attachment" has is that mine mounts to any drill in three (3) different ways for getting into those difficult and often awkward sawing tasks.

2. Drill powered saber saw: U.S. Pat. No. 4,841,643 This tool attachment is merely a long flexible cable that is powered by a drill motor to a tethered reciprocating head. Appears to be not strong enough to handle everyday use. What is so unique about my "Drill Attachment" is it will work with electric drills or the very popular cordless drills. These are the closest prior art that I am aware of to this date, Dec. 21, 1994.

Note: The Milwaukee brand of Sawzall was the forerunner that started the reciprocating saw that it is today. It is a useful tool but I feel it has several disadvantages:

1. It is not cordless.
2. The stroke distance is only one and one-fourth inches (1¼").
3. Does not have flush cut features.
4. Blade mounts in only one (1) position.
5. The blade travels only in one (1) direction from the motor body.
6. It is quite cumbersome in comparison to my Drill Attachment.

Traditionally reciprocating saws came onto the market to be convenient and easier to complete a cutting task. During construction and especially remodeling there is always something to cut or remove. In the past the user would get out the reciprocating saw, untangle an extension cord and then locate a working receptacle, then tackle the task at hand. Now with cordless drills having ample power, torque, and battery longevity, any cutting task can be accomplished much faster and with satisfactory results.

The sawing device attachable to regular drill U.S. Pat. No. 4,949,463 is not easily removable and does not operate in multiple different positions.

Mostly all existing reciprocating saws have only one to one and one-fourth inch (1"–1¼") stroke or cut motion.

The cordless drills today, when used as the power source have an added feature that protects the user and the tool and that is the multiple clutch setting.

The cost too is an important factor and it is of note that every reciprocating saw on the market sells for several times the price of my "Drill Attachment".

This tool is very useful around the house too. Simply put, almost every home has an electric or cordless drill. This tool is designed to not only cut wood but just about any substance as long as the proper blade has been installed.

OBJECTS AND ADVANTAGES

After researching I found only one patent that even came remotely close to mine which is U.S. Pat. No. 4,949,463 to Yi Chang Chen, Aug. 21, 1990.

So I'll do the Objects and Advantages on the basis of existing reciprocating saws rather than drill attachments.

To date I have seen only one cordless reciprocating saw. My drill attachment was conceived for versatility and practicality. It weighs less than half of the existing reciprocating saws and that includes the drill itself. It incorporates three (3) flush cut features and also the bottom has a flush blade design protruding from the unit horizontally or vertically. The working motion or stroke is two (2) full inches while others are content with one inch (1") or one and one-fourth inches (1¼"). My invention can be connected to the drill motor in three (3) different positions. Any quality drill on the market has variable speed and clutch setting adjustments which will enhance the safety of the drill attachment tool. So often, I have encountered tight and awkward places that a normal reciprocating tool would just not fit. The ninety degree (90°) feature is the solution to this problem. The fact that it is cordless means no need for an extension cord or a working electrical outlet. The quick release blade feature can be mounted horizontally or vertically and is an asset over the competition. Further objects and advantages of my invention will become apparent from viewing the drawings and ensuing description.

In some instances the user has to drill a starter hole before progressing to the sawing. The reason being the back and forth motion of the saw blade actually bounces erratically jumping off target and usually bends and breaks the blade; not to mention the pounding and jarring the user encounters until they have fully penetrated the material in question. Reciprocating saws on the market vary in features, quality and cost. The majority of them have two (2) speeds, high and low, and for an added cost they have variable speed. Here again I would like to emphasize no clutch setting. My "Drill Attachment" tool is totally powered by the drill motor which can be controlled if need be by the desired clutch setting. After researching the ten (10) or twelve (12) reciprocating saws on the market the R.P.M. or strokes per minute, "S.P.M." on their two (2) speed models start out at 300–400 S.P.M. (three to four hundred strokes per minute). With the variable speed drill the user could start out at a snail's pace if necessary.

A drill attachment, including:
A. A compact metal housing having helical and worm gear enabling rotation motion to linear reciprocating motion which activates eccentric pin which in turn propels drive arm that is connected to cutting blade, and
B. A cordless, electric or pneumatic drill motor connected to said tool reciprocating sawing action and,
C. Means for controlling coupling rotational energy from the drill motor to safely cut various types of material in unwieldy places or remote areas, and
D. A device having three (3) different female socket entries to receive a male hexagon shaft powered by a cordless, electric or pneumatic drill, and
E. The tool having two (2) sides designed for flush cutting or sawing.

A drill adaptor to convert a cordless drill to a reciprocating saw including:
A. A worm gear fitted into drill chuck having slot to receive the worm gear that meshes with a helical gear that has an eccentric peg attached, and
B. That the eccentric peg is inserted into an elongated slot on blade drive arm which enables the blade drive arm to reciprocate and produce sawing action at various speeds, and
C. A means of sawing materials in confined areas by selecting one (1) of nine (9) configurations, and
D. Has flush cutting features at controlled speeds and power ranges, and E. The tool can work in conjunction with any quality cordless drill in remote locations.

A cordless or electric drill accessory including:

A. A portable hand-held drill driven tool enclosing gear mechanism for reciprocal cutting; and
B. Powered by the rotation delivered from a cordless, electric or pneumatic drill, and
C. Means of saving time in the process of cutting procedures.

DETAILED DESCRIPTION OF THE PREFERRED EMBODIMENT

Figure 1:
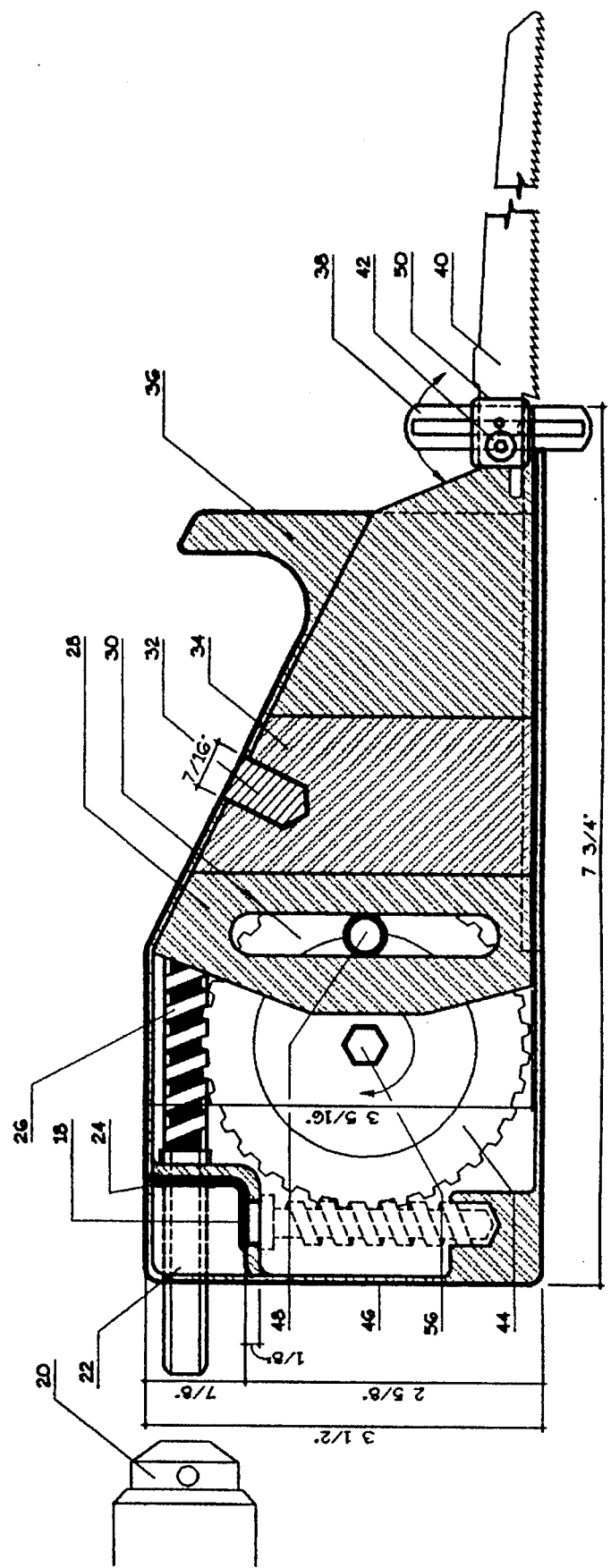
FIG. 1 is a side view showing internal mechanism powered by a hand drill. (RIGHT SIDE VIEW EXTENDED POSITION)
Figure 2:
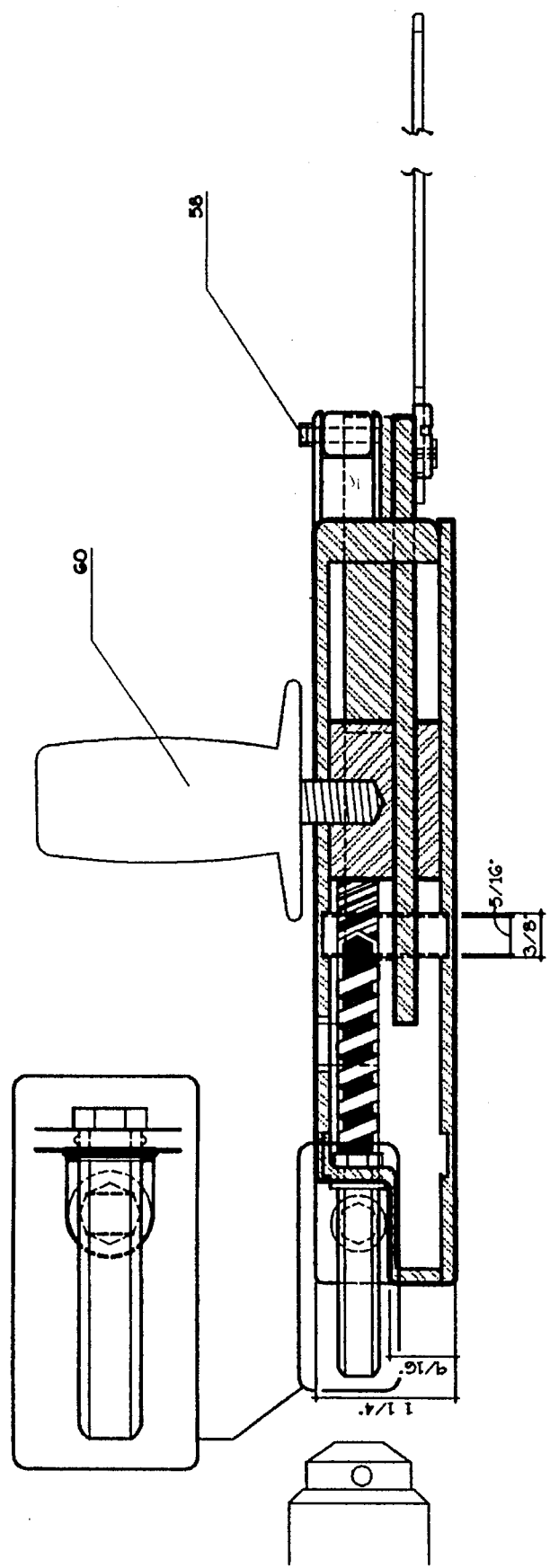
FIG. 2 is a top view showing internal mechanism, removable handle and enlargement showing hexagon shaft and retainer clip. (TOP VIEW EXTENDED POSITION)
Figure 3:
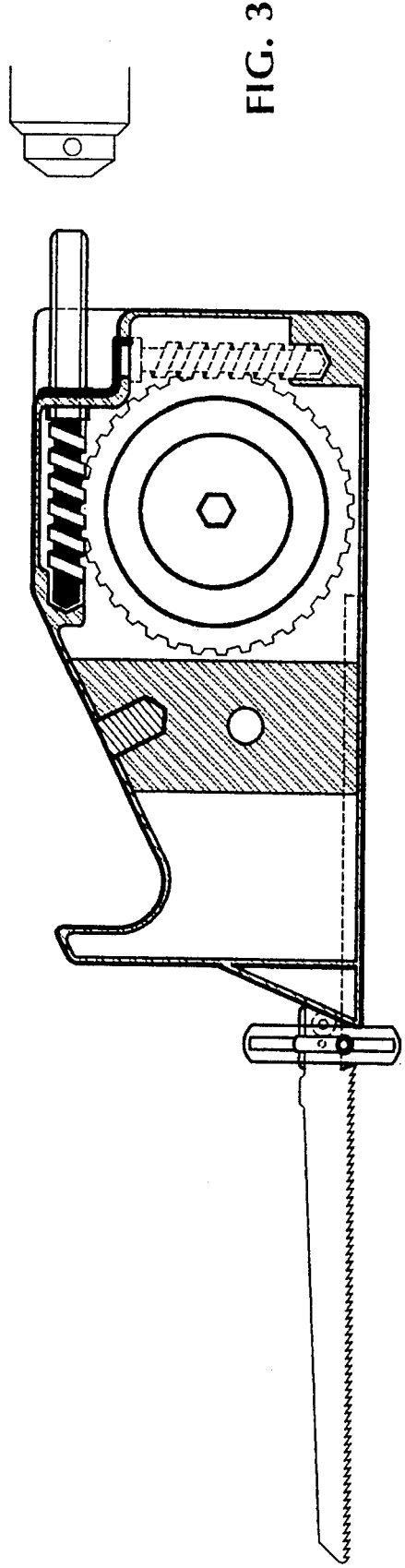
FIG. 3 is an opposing view from FIG. 1 showing internal mechanism, quick release fence feature, and hex fitting on helical gear. (LEFT SIDE VIEW EXTENDED POSITION)
Figure 4:
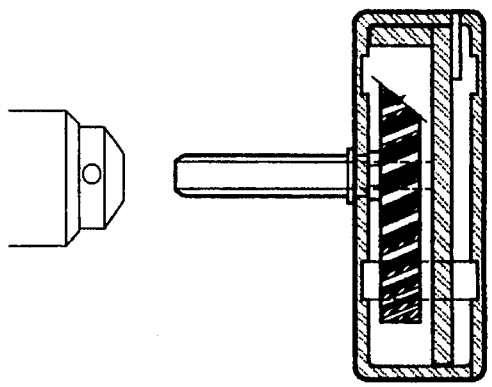
FIG. 4 is a cross sectional view showing housing and inserted hex shaft in place. (FRONT VIEW WITHOUT FENCE)
Figure 5:
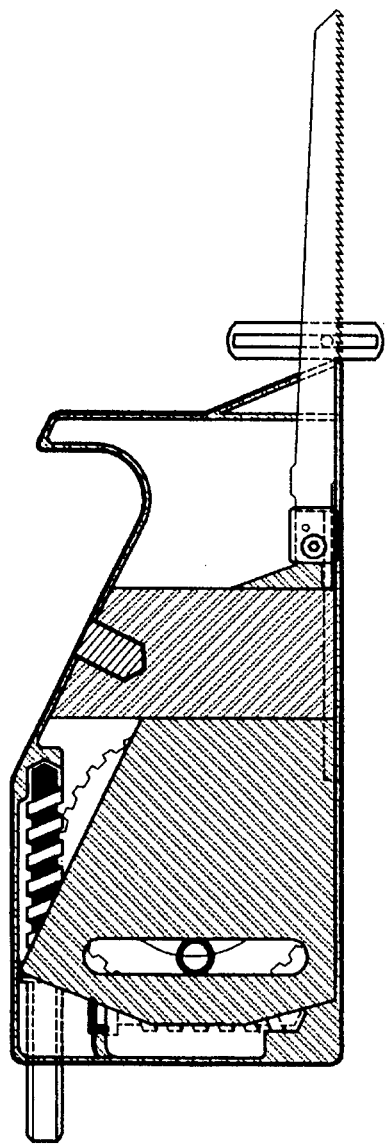
FIG. 5 is the same as FIG. 1 except in the retracted position. (RIGHT SIDE VIEW RETRACTED POSITION)
Figure 6:
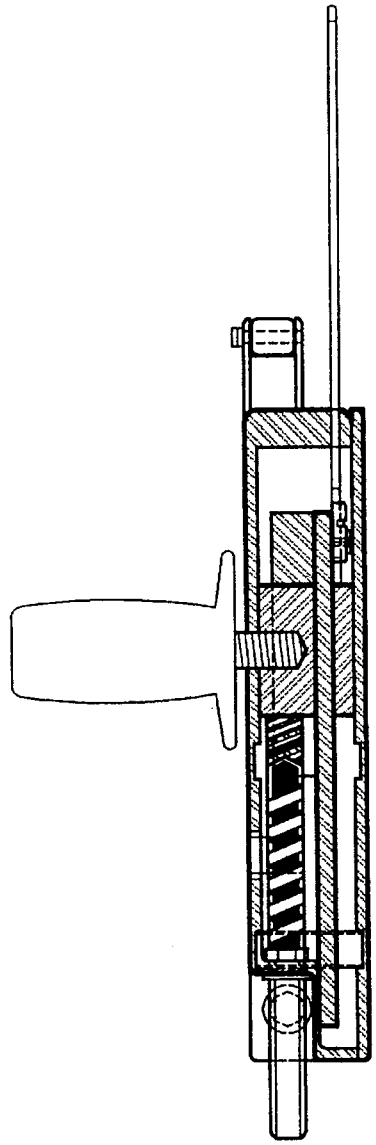
FIG. 6 is the same as FIG. 2 except in the retracted position. (TOP VIEW RETRACTED POSITION)
Figure 7:
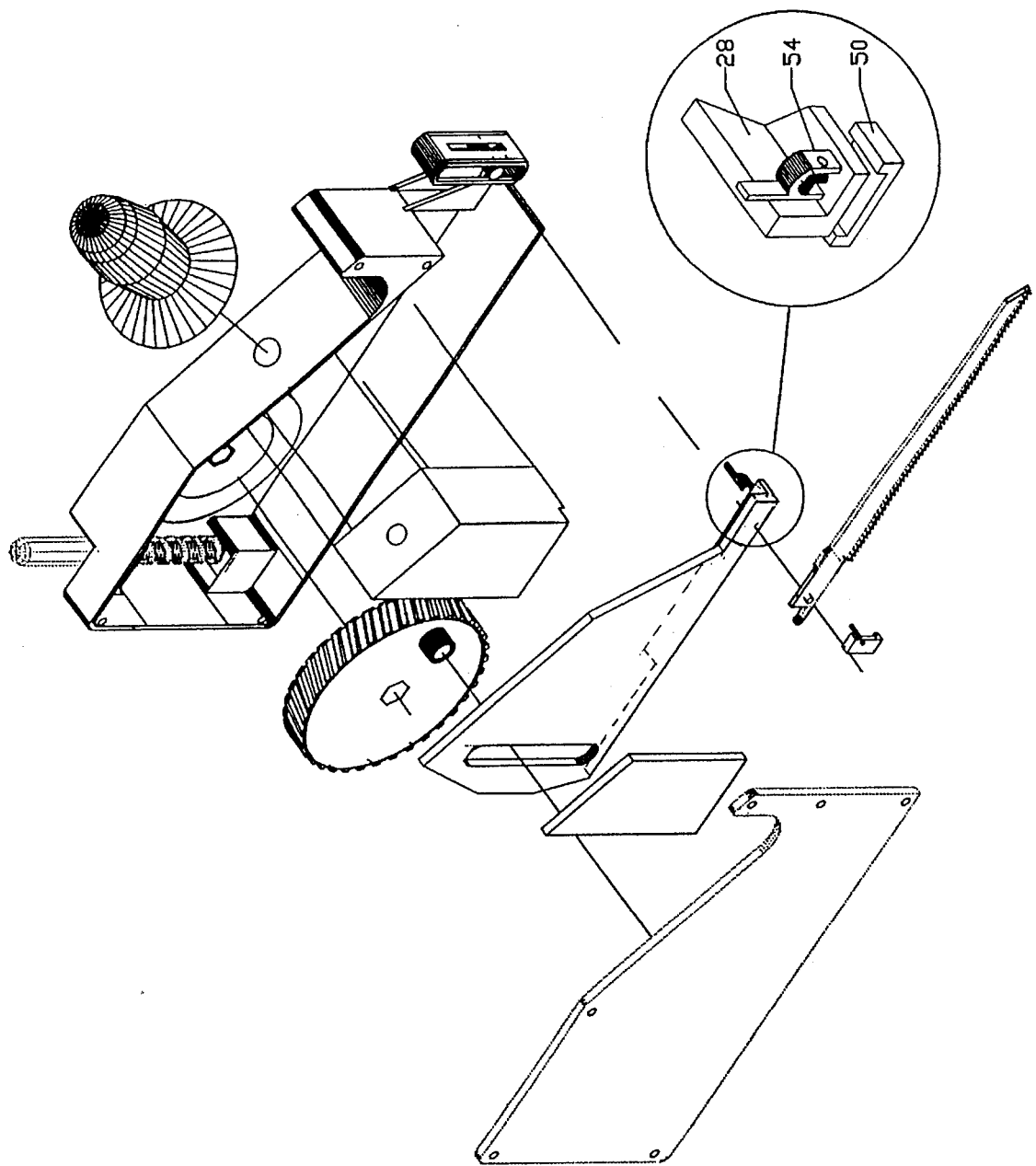
FIG. 7 is an exploded view showing internal parts.
Figure 8:
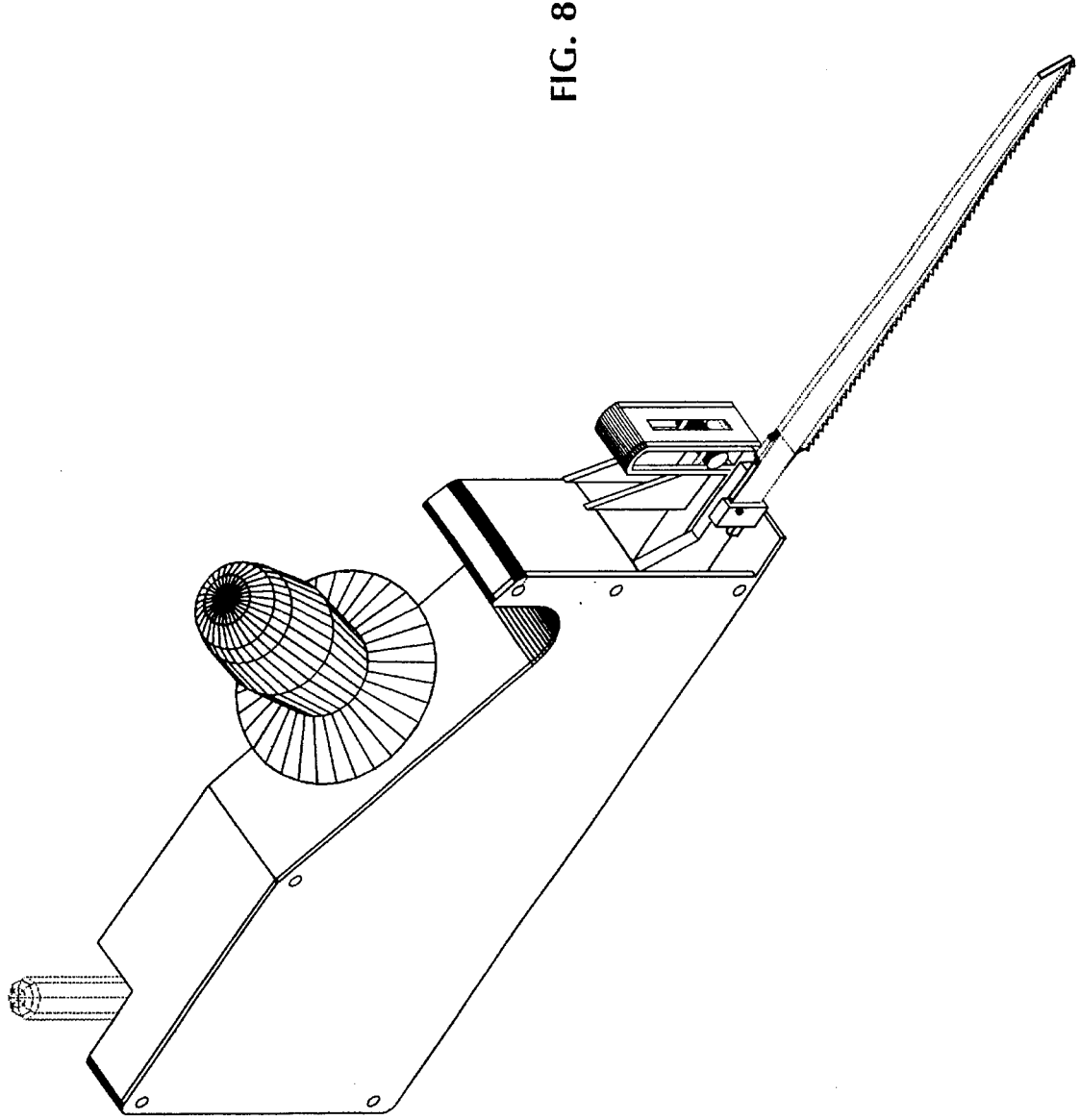
FIG. 8 shows drill attachment assembled.

Referring to FIG. 1, a sawing device attachable to an electric, pneumatic or cordless drill converting rotary motion to reciprocal motion.

From the power source Drill Chuck #20 fits onto Horizontal Hexagon Shaft #22 which fits into a Quad Lead Worm Gear #26 that meshes with a Helical Gear #44 that has an Eccentric Peg #48 the elongated slot in the Drive Arm #30 fits onto the said eccentric peg. The Drive Arm #28 slides back and forth guided and supported by Guide Block #34. The Saw Blade #40 is attached to the said drive arm by means of a Bracket #50 and a Set Screw #42. The Quick Release Blade Feature #54 mounts to the said drive arm on the bottom or the side. The Hand Safety Stop #36 prevents user from accidental injury on Pivoting Fence #38 and/or said saw blade. Removable Handle #60 can be screwed into Threaded Hole #32 or threaded hole on left side of tool for stabilizing purposes. Another angle that Hex Shaft #22 is used is by inserting into Female Hex Hole #56 to use tool 90° from drill motor. Retainer Clip #18 serves as a dust boot to cover horizontal or vertical hole when not in use. Fence Adjustment Release Knob #58 lets user choose the appropriate position of the fence. Quad Lead Worm Gear #26 can be removed from Unit #46 by removing Spring Retainer Clip #18 and can be vertically inserted at dotted worm gear outline. See Figure One.

I claim:

1. A power tool attachment for converting rotary motion from a power tool into reciprocating motion of a saw comprising: a housing, a helical gear mounted in said housing and having a peg mounted eccentrically thereon, a blade connected to a blade drive arm, said blade drive arm reciprocable in said housing and having a slot therein, said peg received in said slot, a pair of worm gears mounted in said housing orthogonally with respect to each other and each being engaged with said helical gear, said worm gears each having an end with a recess therein, said helical gear having a recess in a center portion thereof, and a drive pin receivable in any one of said recesses and a rotatable power tool chuck at opposite ends thereof, whereby rotation of said power tool chuck enables the reciprocation of said blade along an axis parallel to a rotation axis of said power tool chuck or along any axis orthogonal to said axis of said power tool chuck depending upon which recess the drive pin is received.

2. The power tool attachment of claim 1, wherein said recesses in said worm gears and said helical gear are hexagonal recesses.

* * * * *